July 28, 1959 R. J. CHRISTL ET AL 2,897,183
CONSTANT ENVIRONMENT PROCESS FOR POLYMERIZING ETHYLENE
Filed Jan. 13, 1954
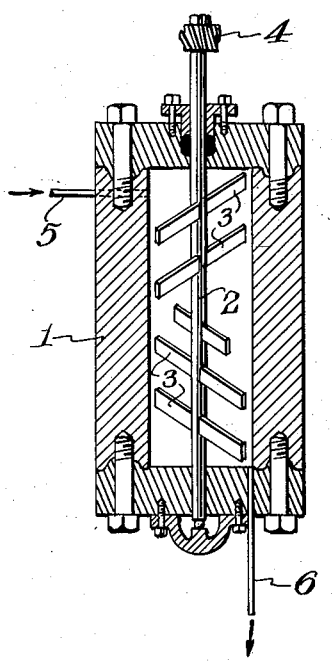
INVENTORS
ROBERT J. CHRISTL
MILTON J. ROEDEL

United States Patent Office 2,897,183
Patented July 28, 1959

2,897,183

CONSTANT ENVIRONMENT PROCESS FOR POLYMERIZING ETHYLENE

Robert J. Christl and Milton J. Roedel, Wilmington, Del., assignors to E. I. du Pont de Nemours and Company, Wilmington, Del., a corporation of Delaware Application January 13, 1954, Serial No. 403,888

6 Claims. (Cl. 260—94.9)

This invention relates to a process for the preparation of polymers of ethylene and is more particularly directed to the preparation of such polymeric compounds by a process in which they are formed by a continuous reaction conducted under constant environment polymerization conditions. This application is a continuation-in-part of our copending application S.N. 320,582, filed November 14, 1952, now abandoned.

Commercially-available polymers of ethylene, although they have many desirable properties, are not what might be characterized as chemical compounds having a definite molecular weight and/or fixed properties. On the contrary, they are made up of a mixture of polymeric compounds having a multiplicity of individual members, many of which have different molecular weights as well as different degrees of branching and hence dissimilar physical properties. These products are commercially available, usually graded according to molecular weight and range of physical properties. On careful examination it will be found, however, that a given grade of product is not a polymer of a definite molecular weight but a mixture of polymers having the average molecular weight of the grade. This average molecular weight is ordinarily determined by some experimental method which is supposed, theoretically at least, to sum up the molecular weights of all the individual polymers present in the mixture and divide the summation by the number of polymer molecules present. The reason that these polymers of ethylene constitute such a heterogeneous mixture of indefinite polymers, having different molecular weights and degrees of branching, is apparent when the conditions used for their preparation are considered.

There are several methods of producing polymers of ethylene which may, for convenience, be classified in three major groups. First, the batch type autoclave method; second, the continuous tubular converter method; and, third, a continuous autoclave method involving polymerization under constant environment conditions.

The batch type autoclave methods are exemplified by the early patents that have issued on the polymerization of ethylene, such as are illustrated by the Fawcett U.S. Patent 2,153,553, issued April 11, 1939. In accord with these processes the autoclave, which generally is in the form of a steel bomb sufficiently rugged to withstand high pressures, 100 to 15,000 atmospheres, required for these polymerizations, is charged with the reactant and an initiator with or without an inert medium in which the reaction is conducted. The bomb is closed, heat applied and as the reaction progresses the input of heat stopped inasmuch as the reaction is highly exothermic. During the heat input phase of the process no reaction takes place until polymerization starts or "lights off" as it is called and then the heat is evolved rapidly and may, if not properly controlled, result in an explosion. In any event the reaction, while possible to give valuable polymers of ethylene, is not controllable to give a constant temperature or a constant pressure.

Not only does the environment with respect to temperature and pressure fluctuate through wide ranges but also, the environment changes with respect to concentrations and physical-chemical properties of the components present. At the beginning of these reactions, with ethylene as one of the reactants, it changes from normally a gas to give finally a polymer that is normally a solid. The phases present in the reaction zone can, accordingly, change with startling rapidity from one phase to another phase. Similarly, free radical concentrations which may be relatively high at the beginning of the reaction may entirely disappear toward the close of the reaction. Furthermore, it has been established that polymer made at the start of the reaction can be reactivated by free radical attack involving a hydrogen transfer process and another chain is then grafted on at the point of attack. Thus the polymer which has been present over the longest time period is more highly branched than polymer formed at the later stages of the reaction. As a consequence of these violent environmental changes the reaction conditions are so varied that a multiplicity of polymers of different molecular weights, different degrees of branching and different physical properties are produced.

Methods are known, however, for producing polymers having a relatively narrow range of molecular weights. The patent of N. W. Krase, U.S. 2,396,791, issued March 19, 1946, is directed to a method of providing such polymers. This patentee's process, however, is directed to the treatment of a produce such as that produced by the Fawcett process and related processes. The Krase invention does not describe a process of producing directly and economically a polymer of a comparatively narrow molecular weight or property range.

The second method involves preparing polymers of ethylene in a continuous tubular unit. In such units the ethylene, together with its initiator and solvent, with or without a diluent, is introduced into one end of a long reaction chamber and the polymerized ethylene is discharged from the opposite end. Temperature control is provided in some units by a cooling jacket extending from one end to the other of the unit. In others, different cooling media and cooling temperatures are provided for certain sections of the tube, thereby controlling to a degree at least the temperature differential which occurs throughout the reaction which extends from the entrance to the exit of the tube. The fact that ethylene polymerizes under superatmospheric pressures and elevated temperatures in the presence of a free radical producing initiator has been established. The effectiveness of the initiator in polymerizing the reaction is measured, inter alia, by the free radicals produced. If all of the initiator is introduced into a tubular unit at the entrance, the largest number of initiator free radicals will usually be present at the entrance, the reaction rate will increase after "light off" at a rapid rate to a peak with a resultant high temperature due to its exothermicity. As the reactants proceed through the unit the number of initiator free radicals will decrease as they are consumed by the reaction. Moreover, from the entrance to the exit a fairly wide temperature range will build up. While valuable commercial polymers of ethylene are produced by proper control of such polymerization systems, the reaction is invariably and inherently subjected to temperature and pressure fluctuations and to wide changes in concentrations.

Another attempt has been made to control the many variables of the ethylene polymerization reaction. The U.S. patent of A. T. Larson, 2,414,311, issued January 14, 1947, describes a method for controlling temperature, pressure, contact time and association of the reactants, especially for the preparation of copolymers, by the upflow of ethylene through a more or less static head of a reaction medium. Operation of this process involves the use of a liquid medium through which the ethylene passes during the reaction. It is often desirable to conduct the polymerization of ethylene in the absence of a second medium which, however, is necessary if this type of process is used. In addition, close control of the Larson process necessitates the removal of reaction medium from the converter, cooling it and returning it to the converter.

The present invention is directed to reactions of the class described in which polymerization is conducted in an environment by a practical and economical process that permits the preparation of polymers having a narrow molecular weight range and outstandingly superior properties.

An object of the present invention is to provide a process for the preparation of new and improved polymers of ethylene. Another object is to provide a process for the polymerization of ethylene in which the ratio of polymer to unreacted ethylene is substantially constant. Yet another object is to provide a process wherein the ethylene is polymerized in an environment that is substantially constant with respect to temperature, pressure and initiator concentration.

The above and other objects of the invention are accomplished by carrying out a continuous process for the polymerization of ethylene under superatmospheric pressures and elevated temperatures in a reaction conducted in an environment that is substantially constant, especially with respect to the ratio of polymer present to the unreacted ethylene. It has been established that extrusion qualities of ethylene polymers are markedly affected by chain linearity, those having greatest linearity lending themselves most readily to handling at higher fabrication rates in the molten condition. Bryant, Journal of Polymer Science, 2, pp. 547–564, June 1947, shows that polymers of ethylene, instead of being simple linear hydrocarbons one would expect from the chemistry of vinyl polymerizations generally, undergo more or less side reactions which introduce a variable degree of chainbranching into the structure. During the polymerization of ethylene, as initiated by the introduction of free radicals of a suitable polymerization initiator, growing ethylene polymer chains of variable chain length are formed. These dead polymer chains can then be reactivated by free radical attack and they then combine with more ethylene to give a branched molecule which influences the average linearity of the polymer eventually produced. As a consequence, the concentration of ethylene polymer present during the course of the polymerization reaction has a marked influence on the molecular size and shape and ultimate physical property of the product mixture.

One feature of the invention involves the maintenance of substantially a constant ratio of polymer to unreacted ethylene throughout the reaction by which a new and improved method is provided for producing polymers not only of relatively uniform molecular weight but also of uniform molecular structure and uniform physical properties. The constant ratio insures this uniformity by virtue of the substantially-identical number of impacts of monomeric and polymeric molecules present. Moreover, initiator consumption is most unexpectedly reduced to 3% or less of that required in a reaction in which ethylene is polymerized in a non-constant environment. Not only does the reduction in initiator consumption lower costs but, also, the product quality is improved due to the marked reduction of initiator residues present therein.

Such a reaction can be conducted in a pressure-resisting autoclave equipped with an agitator, high pressure jet injector, or other suitable mixing device that provides sufficient end-to-end mixing so that substantially complete and instantaneous mixing of the feed with the contents of the autoclave is attained. This also assures that the discharge stream at any instant is at the same temperature and composition as the contents of the autoclave.

The autoclave, in addition to being provided with an adequate device to maintain such violent mixing, is provided with an inlet for the continuous introduction of reactants and an outlet for the continuous discharge of the product, the apparatus being so adapted and arranged, with the inflow of reactants and their heat content and the outflow of product and its heat content, that a substantially constant temperature, pressure, initiator concentration and polymer to unreacted ethylene ratio is maintained.

The invention is more readily understood by reference to the drawing which illustrates in cross-section a cylindrical converter wherein the reaction of the invention can be carried out. The converter 1 is a thick-walled vessel constructed to withstand superatmospheric pressures. Within the vessel is mounted an efficient stirring device with shaft 2 and a plurality of vanes 3 of any satisfactory design that will give a thorough, turbulent end-over-end mixing of the contents of the converter. The stirrer is powered through gear 4 by a suitable prime mover not shown. The feed inlet 5 is preferably located in the upper section of the converter and the product exit 6 in the base of the converter, although the reverse arrangement may be used. Suitable sealing means are employed to insure no leakage of reactants around the rotating shaft 2 where that shaft passes through the upper and lower walls of the converter.

The process of the invention may be conducted in the apparatus in this manner. A mixture of ethylene and a polymerization initiator, such as ditertiary butyl peroxide, is passed into the converter through conduit 5. Stirrer 2 is started and the ethylene feed continued until the desired pressure is reached at which time the valve in conduit 6 is opened and regulated for continuous discharge to maintain the desired pressure in the reactor within close tolerances. The temperature of the reactants is then built up to the "light off" state by any suitable means such as, for example, by the use of a heating jacket surrounding the converter, the use of internal or external electrical type heaters or the like. "Light off" occurs when the temperature is reached at which the polymerization initiator begins to generate free radicals at an appreciable rate. The free radicals induce the polymerization of ethylene and since this reaction is exothermic, the temperature is observed to rise. When the temperature rises slightly the initiator produces free radicals at a faster rate and the exothermic polymerization of ethylene proceeds still faster. For this reason, a marked temperature surge is observed as the reaction "lights off." Once "light off" is obtained the application of heat through jackets into the reaction mixture and/or feed streams is discontinued. The reaction temperature within narrow limits is then maintained by controlling the amount of exothermic polymerization which also maintains a definite monomer-to-polymer ratio within the autoclave. In accord with the type of polymer it is desired to produce, the temperature within the reactor is allowed to build up to the exact temperature that will produce that type of polymer. This is accomplished by, in starting the reaction, regulating the concentration of initiator fed into the reactor. As the desired temperature is approached, the exothermicity of the reaction is adjusted to precisely the desired point by keeping the feed temperature constant and controlling the amount of initiator introduced into the reactor.

The critical feature of this invention is to make a uniform product by providing constant conditions for polymerization. The conditions that we recognize as being most important to control are pressure, temperature, and polymer concentration. The control of pressure is relatively straight-forward, though elaborate provisions must be made to avoid pulsations. The control of temperature and polymer concentration on the other hand requires intense agitation to establish uniformity throughout the autoclave. If regions within the autoclave are improperly agitated, polymerization in such localized zones rises above that in the rest of the vessel, the temperature rises giving local hot spots, and non-constant monomer-to-polymer ratios. In a vertical autoclave it is frequently possible to establish intense lateral zones of agitation, but very definite temperature gradients are observed from top to bottom. It is therefore necessary to obtain proper end-to-end circulation to provide uniform conditions for polymerization and monomer-to-polymer ratios throughout the autoclave.

In operating the process of this invention it has been our practice to employ sufficient agitation to maintain temperature differences between any two points in the autoclave below 5° C. To accomplish this uniformity, the agitator has been operated at speeds that result in rapid end-to-end mixing. We can define the number of circuits (NC) as $$NC = \frac{Gr}{Gf}$$

in which $Gr$ equals end-to-end circulation in pounds per hour and $Gf$ equals the inlet monomer rate in pounds per hour. We then operate at such agitator speeds that the average number of circuits is between 35 and 250 or higher, and preferably above 100. By operating in this manner it has been found that new and improved polymers of ethylene are produced.

The effective number of circuits, discussed supra, at any point in the reactor is reflected in a different temperature at that point than in the main body of the reactor. Thus, if NC were infinite there would be no temperature spread. Practical consideration of power costs limit agitation to degrees that will produce finite values of NC and hence measurable temperature differences. The actual end-to-end circulation is influenced by the physical dimensions of the reactor, the shape of the baffler and agitator blades, and the rotational speed of the agitator. $Gr$ is difficult to measure directly, but can be determined from special tests to measure temperature differences when no reaction is taking place. Thus, for any given system, tests are made to establish the relationship between $Gr$ and the rotational speed of the agitator, so that values of NC can then be calculated from the monomer feed rate during polymerization.

The examples which follow provide preferred embodiments of the invention in which parts are by weight unless otherwise specified.

*Example 1.*—Into a stirred autoclave such as that illustrated by the drawing, ethylene was fed together with dilauroyl peroxide as the initiator and as a solvent a solution comprising 35% cyclohexane and 65% benzene, the solvent to ethylene weight ratio being 1.0. The temperature of this feed initially was about 150° C. The stirrer was started, the ethylene pressure within the autoclave was increased from atmospheric to approximately 22,000 p.s.i. and the initiator concentration increased until the reaction started. As the temperature of the reaction rose, the amount of initiator introduced into the reactor was gradually decreased until a temperature of about 170° C. was attained. The temperature of the ethylene feed was then gradually lowered to 56° C. and the initiator feed rate increased to increase polymerization and maintain the ratio of homopolymer to ethylene at approximately 0.0776. The initiator and ethylene feed streams then had a concentration by weight of about 8 parts of initiator per million parts of ethylene. During the reaction the stirrer was rotated at a sufficient r.p.m. to give an average number of circuits within the reactor of about 80. The average contact time of the ethylene within the reactor was approximately 2.24 minutes, and the ethylene conversion realized was 7.2%.

A homopolymer having these properties was produced continuously: Melt index 1.57; density 0.9271; Vicat (° C.) 108; tensile at break (p.s.i.) 1550; stiffness (p.s.i.) 35,000; film draw rate relative to that of a homopolymer produced by use of a tubular reactor 1.36.

*Example 2.*—The process of Example 1 was repeated with the on-stream introduction of ethylene at a temperature of 18° C., the autoclave temperature at 161° C. and the pressure at 21,000 p.s.i., using 65 p.p.m. based on ethylene of alpha,alpha'-azodiisobutyronitrile as the initiator. Cyclohexane was used as the solvent, the solvent-to-ethylene ratio being 0.48. During the reaction the stirrer was rotated at 250 r.p.m. to give an average number of circuits within the reactor of about 60. The contact time of the ethylene within the reactor was approximately 13 minutes, the ratio of homopolymer-to-ethylene was maintained at approximately 0.22 and the ethylene conversion realized was approximately 18%.

The homopolymer produced had these properties: Melt index 1.02; density 0.9293; tensile strength at break (p.s.i.) 1700; yield point (p.s.i.) 2580; percent elongation 180; film draw rate relative to that of a homopolymer produced by use of a tubular reactor 1.44.

*Example 3.*—The process of Example 1 was repeated with the on-stream introduction of ethylene at a temperature of 33° C., the autoclave temperature at 186° C. and the pressure at 18,000 p.s.i., using 16 p.p.m. based on ethylene of alpha,alpha'-azodiisobutyronitrile as the initiator. Cyclohexane was used as the solvent, the solvent-to-ethylene ratio being 0.21. During the reaction the stirrer was rotated at 250 r.p.m. to give an average number of circuits within the reactor of about 75. The contact time of the ethylene within the reactor was approximately 13 minutes, the ratio of homopolymer-to-ethylene was maintained at approximately 0.12 and the ethylene conversion realized was approximately 11%.

The homopolymer produced had these properties: Melt index 5.48; density 0.9252; tensile strength at break (p.s.i.) 1530; yield point (p.s.i.) 2070; percent elongation 124; film draw rate relative to that of a homopolymer produced by use of a tubular reactor 1.73.

*Example 4.*—The process of Example 1 was repeated with the on-stream introduction of ethylene at a temperature of 26° C., the autoclave temperature at 161° C., and the pressure at 24,000 p.s.i., using 11 p.p.m. based on ethylene of alpha,alpha'-azodiisobutyronitrile as the initiator. Cyclohexane was used as the solvent, the solvent-to-ethylene ratio being .14. During the reaction the stirrer was rotated at 250 r.p.m. to give an average number of circuits within the reactor of about 70. The contact time within the reactor was approximately 17.1 minutes, the ratio of homopolymer-to-ethylene was maintained at approximately 0.12 and the ethylene conversion realized was approximately 10.6%.

The homopolymer produced had these properties: Melt index 7.7; density 0.9327; tensile strength at break (p.s.i.) 1600; yield point (p.s.i.) 2550; percent elongation 92; film draw rate relative to that of a homopolymer produced by use of a tubular reactor 1.96.

*Example 5.*—The process of Example 1 was repeated with the on-stream introduction of ethylene at a temperature of 56° C., the autoclave temperature at 160° C., and the pressure at 21,000 p.s.i., using 50 p.p.m. based on ethylene of alpha,alpha'-azodiisobutyronitrile as the initiator. Cyclohexane was used as the solvent, the solvent-to-ethylene ratio being 1.01. During the reaction, the stirrer was rotated at 250 r.p.m. to give an average number of circuits within the reactor of about 50. The contact time within the reactor was approximately 11.8 minutes, the ratio of homopolymer to ethylene was maintained at approximately 0.098 and the ethylene conversion realized was approximately 8.9%.

The homopolymer produced had these properties: Melt index .17; density 0.9260; tensile strength at break (p.s.i.) 2265; yield point (p.s.i.) 2305; percent elongation 550; film draw rate relative to that of a homopolymer produced by use of a tubular reactor 2.59.

*Example 6.*—Into a stirred autoclave such as that illustrated by the drawing, ethylene was fed at a temperature of about 180° C. together with ditertiary butyl peroxide. The stirrer was started, the ethylene pressure within the autoclave increased to approximately 16,000 p.s.i. and the initiator concentration increased until the reaction commenced. As the temperature of the reaction rose the amount of initiator introduced into the reactor was gradually decreased until a temperature of about 220° C. was attained. The temperature of the ethylene feed was then gradually lowered to 0° C. while the initiator feed was increased to maintain the reaction temperature of 220° C. The initiator and ethylene feed streams then had a concentration by weight of about 8 parts of initiator per million parts of ethylene. During the reaction the stirrer was rotated at a sufficient r.p.m. to give an average number of circuits within the reactor of about 100 per minute. The ratio of homopolymer to ethylene was maintained at approximately 0.150 and the ethylene conversion realized was approximately 13.

The homopolymer produced had these properties: Melt index 2.91; density 0.9159; Vicat (° C.) 89; tensile at break (p.s.i.) 1570; elongation (percent) 490; stiffness (p.s.i.) 25,600; film draw rate relative to that of a homopolymer produced by use of a tubular reactor 2.20.

*Example 7.*—Into a stirred autoclave such as that illustrated by the drawing, ethylene was fed at a temperature of about 180° C. together with ditertiary butyl peroxide. The stirrer was started, the ethylene pressure within the autoclave was increased to approximately 22,000 p.s.i. and the initiator concentration increased until the reaction commenced. As the temperature of the reaction rose the amount of initiator introduced into the reactor was gradually decreased until a temperature of about 256° C. was attained. The temperature of the ethylene feed was then gradually lowered to 40° C. while the initial feed was increased to maintain the reaction temperature of 256° C. The initiator and ethylene feed streams then had a concentration by weight of about 8 parts of initiator per million parts of ethylene. During the reaction the stirrer was rotated at a sufficient r.p.m. to give an average number of circuits within the reactor of about 100 per minute. The ratio of homopolymer to ethylene was maintained at approximately 0.18 and the ethylene conversion realized was approximately 15.

The homopolymer produced had these properties: Melt index 2.92; density 0.9144; Vicat (° C.) 88; tensile at break (p.s.i.) 1770; elongation (percent) 540; stiffness (p.s.i.) 25,500; film draw rate relative to that of a homopolymer produced by use of a tubular reactor 1.79.

In the examples the film draw rate means that the homopolymers produced by the described process can be fabricated as a film, bar, tube, pipe or the like by extrusion from a melt at a rate compared with the rate of 1.0 for a homopolymer produced in a tubular reactor. These new polymers give the much higher rates despite the fact that both have approximately the same average molecular weight as judged by melt index determinations.

The process of the invention may be carried out within the well-known conditions of temperature (40° C. to 350° C.), pressure (50 to 3000 atms.), initiator and reactant proportions for polymerizing ethylene to solid polymers. These conditions have been amply described in the prior art and need not be reiterated here. When carrying out these processes in accord with the conditions specified in that art, superior types of products are produced by the essentially-constant environment of the invention.

Temperatures, pressures, concentration of reactants and products are maintained substantially constant throughout the reaction. The superior products of the invention are attributable, inter alia, to the maintenance of a constant ratio of homopolymer to unreacted ethylene, a low ratio giving optimum products. This ratio on a weight basis should range between 0.05 and 0.50 and for optimum products of superior extrudability should be maintained between 0.05 to 0.25. When thus maintained homopolymers are produced continuously, having properties heretofore never obtained by a continuous commercial process.

In contradistinction to the prior art processes, the process of the invention may be conducted and the course of the reaction directed, inter alia, by introducing the ethylene into the reaction at a constant rate and at a wide range of temperatures, for example, between −103° and +100° C. and preferably between −50° and +50° C. Low feed temperatures are possible because of the substantially-instantaneous dispersion of the introduced ethylene throughout the reacting mass without altering the direction or course of the reaction, the heat of reaction being used to heat the feed ethylene practically instantaneously to reaction temperature.

Any suitable ethylene polymerization initiator may be used for the polymerization, such, for example, as the dialkyl peroxides and more particularly diethyl peroxide, ditertiary butyl peroxide and the like as well as other initiators, such, for example, as hydrogen peroxide, benzoyl peroxide, lauryl peroxide, diethyl peroxy dicarbonate, tetraethyl lead, aluminum hydride, triethyl aluminum, ethyl magnesium chloride, and the azo catalysts such as those described in the Hunt U.S. Patent 2,471,959, issued May 31, 1949.

Control of the reaction, it should be reiterated, results inter alia from the conjoint operation of the process as influenced by turbulent mixing, by the temperature of the reactants introduced into the reaction zone and by the rate at which polymerization proceeds as controlled by the initiator injection rate. For each reaction temperature and for each reaction, these variables are adjusted to insure adequate mixing in order to maintain a substantially-constant and uniform environment for the polymerization of ethylene at the desired monomer-to-polymer ratio.

We claim:

1. In a continuous process for the preparation of normally solid homopolymers of ethylene, the step which comprises conducting the homopolymerization of ethylene at temperatures between 40° C. and 350° C. and pressures between 50 and 3000 atmospheres and in the presence of an ethylene polymerization initiator in an environment in which the ratio of homopolymer to unreacted ethylene throughout the reaction is maintained at a substantially-constant ratio between 0.05 and 0.50 by maintaining end-to-end mixing of between 30 and 200 average number of circuits of the reacting mixture in accord with the equation:

$$NC = \frac{Gr}{Gf}$$

in which NC is the number of circuits, $Gr$ is the end-to-end circulation in pounds per hour and $Gf$ is the inlet ethylene rate in pounds per hour.

2. In a continuous process for the preparation of normally solid homopolymers of ethylene, the step which comprises conducting the homopolymerization of ethylene at temperatures between 40° C. and 350° C. and pressures between 50 and 3000 atmospheres and in the presence of an ethylene polymerization initiator in a stirred autoclave into which ethylene is introduced at a uniform rate and from which the homopolymer of ethylene and unreacted ethylene are discharged at a uniform rate and during which the reactants are maintained in the autoclave with end-to-end mixing and with between 35 and 200 average number of circuits per hour of the reacting mixture from one end to the other of the autoclave to provide a ratio of homopolymer to unreacted ethylene throughout the homopolymerization reaction at a substantially constant ratio between 0.05 and 0.50.

3. The process of claim 2 in which the average number of circuits is above 100.

4. In a continuous process for the preparation of normally solid homopolymers of ethylene, the steps which comprise conducting homopolymerization in a stirred autoclave and producing normally solid homopolymers of ethylene having a narrow molecular weight range, maintaining in the autoclave a ratio between 0.05 and 0.50 of homopolymer to unreacted ethylene substantially constant throughout the reaction, continuously charging ethylene and an ethylene polymerization initiator into the autoclave and continuously discharging the homopolymer produced and unreacted ethylene from the autoclave, effecting substantially instantaneous dispersion of the introduced ethylene and initiator throughout a reacting mass, controlling the temperature between any two points in the autoclave within 5° C. of a predetermined temperature between 150° C. and 256° C., and controlling a predetermined pressure substantially constant between 16,000 and 24,000 pounds per square inch, said ratio, initiator dispersion and control of temperature being maintained by end-to-end mixing in the autoclave to the extent of between 35 and 200 average number of circuits of the reacting mixture in accord with the equation:

$$NC = \frac{Gr}{Gf}$$

in which NC is the number of circuits, $Gr$ is the end-to-end circulation in pounds per hour and $Gf$ is the inlet ethylene rate in pounds per hour.

5. In a continuous process for the preparation of normally solid homopolymers of ethylene, the steps which comprise carrying out the homopolymerization in a stirred autoclave at temperatures between 40° C. and 350° C. and pressures between 50 and 3000 atmospheres and in the presence of an ethylene polymerization initiator, introducing ethylene continuously into the autoclave, removing homopolymers of ethylene from the autoclave and unreacted ethylene continuously from the autoclave and stirring the contents of the autoclave by maintaining end-to-end mixing of at least 35 average number of circuits, with the quantities measured in units of pounds per hour, of the reacting mixture in accord with the equation:

$$NC = \frac{Gr}{Gf}$$

in which NC is the number of circuits, $Gr$ is the end-to-end circulation in pounds per hour and $Gf$ is the inlet ethylene rate in pounds per hour, to provide throughout the reaction a substantially constant ratio of homopolymer of ethylene to unreacted ethylene at a ratio between 0.05 and 0.50 and to maintain temperature differences between any two points in the autoclave below 5° C.

6. In a continuous process for the preparation of normally solid homopolymers of ethylene, the steps which comprise homopolymerizing ethylene in the presence of a homopolymer present in a definite ratio of homopolymer to unreacted ethylene, between 0.05 and 0.50, and continuing the homopolymerization at temperatures between 40° C. and 350° C. and pressures between 50 and 3000 atmospheres and in the presence of an ethylene polymerization initiator in an environment of homopolymerization in which the ratio of homopolymer to unreacted ethylene is kept substantially constant throughout the reaction by maintaining end-to-end mixing of at least 35 average number of circuits, with the quantities measured in units of pounds per hour, of the reacting mixture in accord with the equation:

$$NC = \frac{Gr}{Gf}$$

in which NC is the number of circuits, $Gr$ is the end-to-end circulation in pounds per hour and $Gf$ is the inlet ethylene rate in pounds per hour.

References Cited in the file of this patent
UNITED STATES PATENTS

| | | |
|---|---|---|
| 2,238,802 | Altshuler et al. | Apr. 15, 1941 |
| 2,420,330 | Shriver et al. | May 13, 1947 |
| 2,425,638 | Peterson | Aug. 12, 1947 |
| 2,493,917 | Hengstebeck | Jan. 10, 1950 |
| 2,570,056 | Halbig | Oct. 2, 1951 |
| 2,640,049 | Rothrock | May 26, 1953 |
| 2,675,370 | Barrett | Apr. 13, 1954 |
| 2,683,141 | Erchak | July 6, 1954 |
| 2,692,261 | Peters et al. | Oct. 19, 1954 |